Patented June 7, 1932

1,861,987

UNITED STATES PATENT OFFICE

GEORGE H. STEVENS, OF NEWARK, NEW JERSEY

VULCANIZING RUBBER

No Drawing. Original application filed July 16, 1923, Serial No. 651,968. Divided and this application filed August 25, 1927. Serial No. 215,511.

This invention relates to improvements in the use of organic, nitrogenous, substances that assist in or accelerate the vulcanization of rubber.

This specification is a division of Ser. No. 651,968 filed July 16, 1923, relating to combinations of mono- and tri-substituted guanidines.

The object of this invention is the utilization of mono-phenyl substituted carbodiimide, its polymers and homologues, with the guanidine products that result from their reaction with ammonia, and which constitute the mono-substituted element in the combination that is the parent invention.

Concurrent with the filing of this division of 651,968 a like division is also filed relating mainly to di-phenyl substituted carbodiimide, its polymers and homologues, and the guanidine products that result from their reaction with aniline, or with a primary monamine homologous to aniline.

In a previous application (Ser. No. 399,979), filed July 30, 1920, I mentioned mono-phenyl guanidine ($C_7H_9N_3$), as a rubber accelerator, having a nitrogen content of 31%.

Mono-phenyl guanidine has a melting point of 66° C., is quite hygroscopic, is soluble in water, and decomposes readily at a temperature a little above its melting point and in so doing splits off ammonia, with carbomonophenylimide ($C_7H_6N_2$), (or its equivalent phenyl-cyanamide or cyanilide), as the main decomposition product, of very low melting point and readily polymerizable to a much higher melting point. Its tri-molecular polymerization product being a melamine with three phenyl substitutions.

Tri-phenyl guanidine, while it does not decompose at as low a temperature as the mono-phenyl guanidine, nevertheless decomposes readily at vulcanizing temperatures and splits off aniline, with its main decomposition product as carbodiphenylimide ($C_{13}H_{10}N_2$), (or its equivalent diphenylcyanamide), also of very low melting point and readily polymerizable to a much higher melting point. Its tri-molecular polymerization product being a melamine with six phenyl substitutions.

Carbomonophenylimide and carbodiphenylimide are both of them very reactive bodies and especially so in the presence of the decomposition products that are naturally present with them.

They will polymerize with each other in more than one molecular proportion, each will combine with either aniline or ammonia, and either will combine with more than one phenylguanidine.

Both carbomonophenylimide and carbodiphenylimide form polymerization products which also are more or less reactive with the same bodies as their lower polymers.

The aniline and ammonia released with these two carbophenylimides is also reactive with more than one of the phenylguanidines.

In the reaction of mono-phenyl guanidine under vulcanization and with a metallic oxide present, the result appears to be:

Decomposition of the mono-phenyl guanidine, first into carbomonophenylimide and ammonia, then a dissipation of the ammonia, and then a gradual combination or polymerization of the carbomonophenylimide into a phenyl substituted melamine possessing a melting point far above that of the product started with, and of considerable stability.

In vulcanization then this would indicate an early activity of the mono-phenyl guanidine while the ammonia was being split off, then a stage where molecules of the carbomonophenylimide were polymerizing together, and then an ultimate stage where the progressive polymerization has resulted in an accumulation of the higher melting body as a tri-molecular polymerization product, or melamine of the carbomonophenylimide, and therefore would be tri-phenyl melamine, and which because of its high melting point tends to inhibit further vulcanization in the cold, and so the resultant rubber compound stands aging better according as this melamine displaces the other intermediate products resulting from the decomposed accelerator.

An illustration of the formation of a phenyl substituted melamine is a combining or polymerizing together of three molecules of a phenyl substituted carbodiimide, and the resultant phenyl substituted melamine will then contain as many phenyl groups as the three molecules of the phenyl substituted carbodiimide contained.

Carbomonophenylimide is found to be quite active, as more than one molecule of it will combine together, and it will also combine with carbodiphenylimide, either as a single molecule of each to produce tri-phenyl dicarbodiimide melting at 70 to 74° C. ($C_{20}H_{16}N_4$ Ber. 1887, 20, 1065), or as two molecules of the former with one of the latter to produce tetra-phenyl melamine ($C_{27}H_{22}N_6$), melting at 217° C. (Ann. 1850, 74, 6; Ber. 1874, 7, 1736; Ber. 1875, 8, 912; Monatsh. 1877, 403; Ber. 1887, 20, I, 1065).

Carbomonophenylimide will also readily combine with aniline to di-phenyl guanidine ($C_{13}H_{13}N_3$), and then in turn can also combine with the di-phenyl guanidine to tri-phenyl biguanide ($C_{20}H_{19}N_5$ Ber. 1890, 23, 1668), melting at 137° C.

The presence of metallic oxides in a vulcanization causes the decomposition or breaking up of these accelerators at temperatures much lower than would cause the same reactions normally.

In the event that the presence of moisture in these decomposition reactions of the accelerator should cause a molecule of water to unite with the phenyl substituted carbodiimide, then corresponding phenyl ureas would form instead, but with sufficient of the amine present, the water will duly split off again and the product then follow its normal path of decomposition.

Many of these reactions are reversible and the temperatures that cause the combination also cause in turn again their disassociation.

Should mono-phenyl guanidine or its disassociation products during vulcanization form combinations with sulphur or with any of the other usual compounding constituents, such compounds would appear to be largely catalytic, and rejuvenation of any of them, or of their decomposition products later, would permit the normal reactions and disassociation to continue.

That such reactions do continue has authoritative support, as well as being observable in general practice (Ostromuislensky, Jour. Russ. Phys. Chem. Soc. 47, 1892, 8, 1915).

The foregoing relates to mono-phenyl guanidine, to its components, and to its decomposition or disassociation products. However, much the same series of reactions seem to also take place with the tolyl, xylil, or other substituted guanidines respectively, that are homologous to mono-phenyl guanidine, and that limits its members to that series wherein the aryl radicals differ only, in the number of $CH_3$ substitutions in the benzene ring.

While aniline enters into the production of mono-phenyl guanidine, in a like manner the homologues of aniline, such as toluidine and xylidine, bear a similar relation in the production of the corresponding tolyl and xylil substituted guanidines respectively. Mono-substituted guanidines having such homologous radicals are then quite suitable for use together.

Such a mixture might be desirable, as an accelerator, and if it was in the form of a solid solution it would permit both guanidines to function at their best under a common melting point.

In my investigation of that series of compounds of which monophenyl guanidine, or its equivalent components or disassociation products is an example, I have found that they prove of unusual value in the acceleration of rubber vulcanization.

Mono-phenyl guanidine is readily made by desulphurizing mono-phenylthiourea in the presence of ammonia (Ber. 1879, 12, 1602). The mono-phenylthiourea resulting from a union of phenyl mustard oil and ammonia.

Mono-phenyl guanidine is also made by combining carbomonophenylimide and ammonia (Beilstein, 1883, II, 920).

Another way of producing it is from cyanamide (carbodiimide), and aniline hydrochloride (Am. Chem. Jnl. 1901, 26, 221; Ber. 1904, 37, 1681; Richter, 1922, II, 104). The acid salt of course being neutralized.

Mono-phenyl guanidine is also a decomposition product of phenylbiguanide (Monatsh. 1891, 12, 17).

A desulphurization of mono-phenyl thiourea also gives the same phenyl substituted carbodiimide as does the decomposition of the corresponding mono-phenyl guanidine.

In using mono-phenyl guanidine with the carbomonophenylimide component or disassociation product, such combination can be a mere mixture, or in the form of a solid solution, or each may be added separately to the rubber mix, and either or both may be used in the rubber mix in conjunction with ammonia.

Any of these means, or any other means for effecting an acceleration activity of mono-phenyl guanidine in conjunction with carbomonophenylimide, or the introduction into a vulcanization of any polymeric form of carbomonophenylimide (as easy to obtain or to make as the guanidine), with ammonia, or in the presence of any product that will supply ammonia in a manner to effect a similar reaction activity is intended to be covered by this specification.

The mono-substituted guanidines homologous to mono-phenyl guanidine show much the same reaction behavior under vulcanizing conditions, because the guanidine nucleus is the same in each and any variation in them is due to the variation in the aryl amine that supplies the homologous radical.

My invention then consists in making use of these mono-substituted guanidines and their substituted carbodiimide components and disassociation products in the vulcanization of rubber, wherein I find that the resultant vulcanized products are thereby greatly improved.

The quantity of these accelerators to be used in the rubber mix is from ½ to 1% on the rubber content, and the compounding formula may be any of the usual types.

10 to 30% of substituted carbodiimide may be used with the substituted guanidine, and much larger percents if an aryl amine, or an ammonia generating body is also present.

It is to be understood that I do not limit myself to the ingredients, components and proportions given in this specification, or merely to such examples as have been cited by me, it being readily understood by those well versed in the art, that said ingredients, components and proportions may be varied within comparatively wide limits without departing from the principles and purposes of my invention as herein set forth.

Having now described my invention and having shown in what manner the same may be utilized, what I claim as new, and desire to secure by Letters Patent is:

1. A process of vulcanizing rubber which consists in, incoporating into compounded rubber an accelerator, comprising a mono-phenyl substituted guanidine combined with a mono-phenyl substituted carbodiimide, then heating the resultant rubber mixture with a vulcanizing agent to effect vulcanization.

2. A process of vulcanizing rubber which consists in incorporating into compounded rubber an accelerator comprising a mono-substituted guanidine combined with a mono-substituted carbodiimide that are respectively homologous to mono-phenyl substituted guanidine and mono-phenyl substituted carbodiimide, then heating the resultant rubber mixture with a vulcanizing agent to effect vulcanization.

3. A vulcanized compound derived from compounded rubber or similar material combined with a vulcanizing agent and an accelerator comprising a mono-phenyl substituted guanidine and a mono-phenyl substituted carbodiimide.

4. A vulcanized compound derived from compounded rubber or similar material combined with a vulcanizing agent and an accelerator comprising a mono-substituted guanidine and a mono-substituted carbodiimide that are respectively homologous to mono-phenyl substituted guanidine and mono-phenyl substituted carbodiimide.

GEORGE H. STEVENS.